June 24, 1930. A. G. HAWKES 1,766,994
BODY FOR MOTOR VEHICLES
Filed Nov. 23, 1927 2 Sheets-Sheet 1

INVENTOR
ARTHUR G. HAWKES
BY
ATTORNEY

June 24, 1930. A. G. HAWKES 1,766,994
BODY FOR MOTOR VEHICLES
Filed Nov. 23, 1927 2 Sheets-Sheet 2
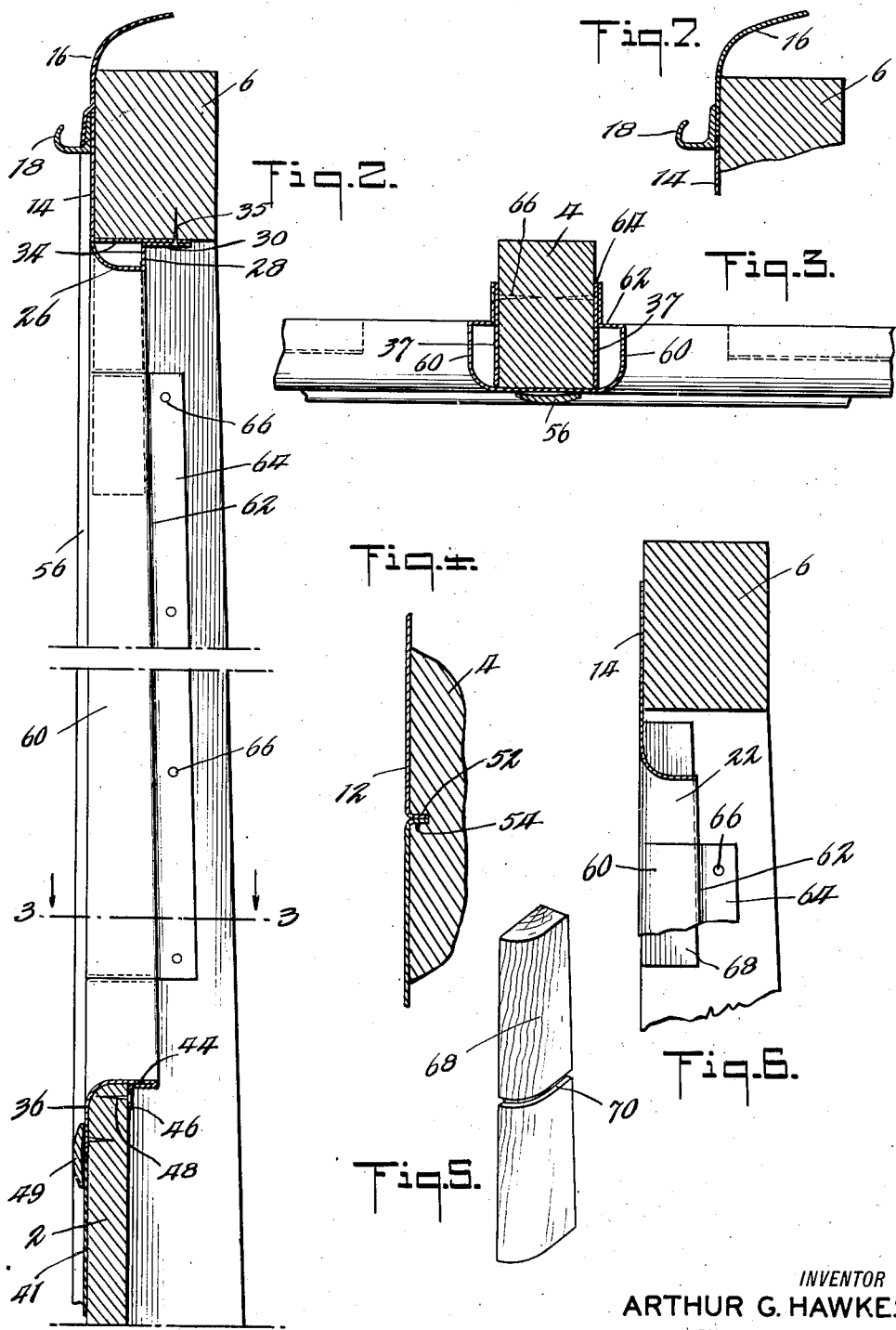
INVENTOR
ARTHUR G. HAWKES
BY
ATTORNEY Patented June 24, 1930

1,766,994

UNITED STATES PATENT OFFICE

ARTHUR G. HAWKES, OF DETROIT, MICHIGAN, ASSIGNOR TO AMERICAN CAR AND FOUNDRY MOTORS COMPANY, OF NEW YORK, N. Y., A CORPORATION OF NEW YORK

BODY FOR MOTOR VEHICLES

Application filed November 23, 1927. Serial No. 235,279.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In the drawings:

Fig. 2 is a sectional view on the line 2—2, Fig. 1;

Fig. 3 is a sectional view on the line 3—3, Fig. 2.

Fig. 4 is a sectional view on the line 4—4, Fig. 1.

Fig. 5 is a perspective view of one of the filler strips used with the invention; and Fig. 6 is a sectional view on the line 6—6, Fig. 1.

Fig. 7 is a sectional view showing a modified form of connection of the roof sheet and panel.

Figure 1:
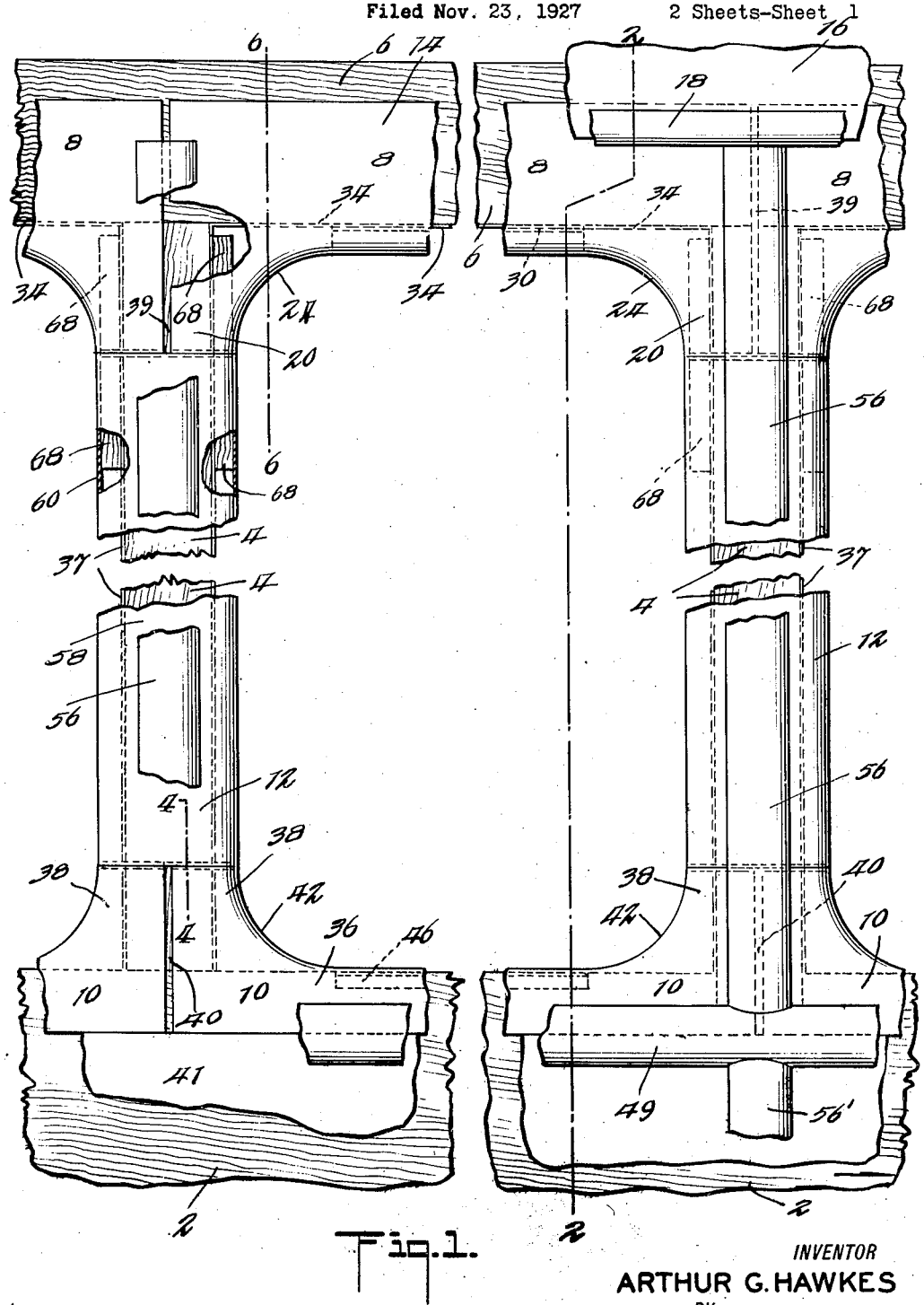
Figure 1 is a broken front elevation of a portion of the body of a motor vehicle, showing the present invention.

This invention relates generally to motor vehicle bodies such as those of the motor bus type and has particular reference to window framing for such bodies.

One of the objects of this invention is to provide multi-unit panelling for defining the window frames of a motor vehicle such as a bus or the like.

A further object of the invention is to facilitate the assemblage of the usual motor bus construction by the utilization of unit sections which are so formed that they may be easily and quickly assembled, and which are applicable to any predetermined post spacing of such construction to produce a finished window frame.

Having this general object in view, the invention contemplates the construction of the window portions of the sides and rear of a motor bus or the like from unit sections corresponding in size to approximately the width of the window openings, with adjacent sections united to effect a resultant strong and durable series of window portions or frames.

Broadly speaking, the invention comprises a plurality of metal sections stamped, pressed or otherwise formed into the desired shape and being so formed that they may be arranged at the top and bottom portions of a window frame, each section including oppositely arranged curved corners to provide a construction which not only is pleasing to the eye but which is self-reinforcing. The sections are arranged side by side at the top and bottom of the window portion of a vehicle, and each section overlies a body post in such a manner that the side edges of adjacent sections will lie approximately in the center or to one side of the center of the body post in spaced relation to each other, the spaces between the adjacent sections being covered by suitable molding to provide a finished assembly.

Referring now to the drawings in detail, Fig. 1 shows a portion of a motor vehicle having a belt rail 2, and posts 4, which extend between the belt rail and a side plate indicated at 6.

The window openings in a motor vehicle are defined usually by the posts and Fig. 1 discloses a vehicle of this type in which the window openings are primarily defined by the belt rail, the side plate, and the spaced posts 4. The invention comprises the application of a metallic frame formed by a plurality of unit sections secured to the aforesaid elements, and specifically there are provided upper and lower series of units arranged side by side and designated generally at 8 and 10 respectively together with connecting panels designated broadly at 12.

The units 8 are preferably of the form illustrated clearly in Figs. 1 and 2 and comprise a main or attaching portion 14 arranged against the side plate 6 and of such height as to be overlapped by the roof sheet 16 and the gutter 18. Fig. 7 shows a modified form of construction in which the lower edge of the roof sheet is arranged adjacent the upper edge of the panel attaching portion 14 and the gutter 18 secured across the joint.

Inasmuch as the units 8 are identical, a description of one will suffice for all; and now, referring to the complete unit 8 shown in Fig. 1, it can be seen that the same is provided with end extensions 20 which overlie a portion of each post 4. The inner edge of the unit 8 is inwardly flanged from the end of one extension to the end of the other extension in a manner such as to provide the curved corner portions 24, and the inwardly and downwardly flanged intermediate portion 26 shown in Fig. 2. The edge of the portion 26 is extended and bent upwardly and outwardly to provide a bearing face 28 against which the window pane (not shown) is adapted to rest, and an upper attaching flange 30 which is arranged adjacent a lining sheet 34. Suitable fastenings 35 are employed for securing the unit to the side plate 6 as clearly shown in Fig. 2. The sides of the posts 4 are also provided with lining sheets indicated at 37 in Fig. 3. As clearly shown in Fig. 1, the upper units are so arranged side by side that each thereof overlies the post 4 and a space 39 is provided between the side edges of adjacent units.

The lower units 10 each comprise a main or body portion 36 arranged for attachment to the belt rail 2 with the lower edges thereof in close engagement with the edge of the sheathing 41 of the body, and each main portion is provided with the end extensions 38 which overlie the posts 4 with the side edges of adjacent sections arranged in spaced relation as clearly shown in Fig. 1, the space being indicated at 40. The inner edge of each unit 10 is inwardly flanged to define the curved corner portions 42, and intermediate the curved corner portions the material of the main section is re-turned upon itself as shown at 44 in Fig. 2 and then is downwardly flanged as at 46 to form an attaching portion lying in engagement with the upper edge of the inner face of the belt rail 2 and secured thereto by suitable fastenings such as the nails 48. As also clearly shown in Fig. 2, the upper edge of the belt rail 2 is rounded and the material of the unit 10 is correspondingly rounded at the flange to closely engage the upper edge of said belt rail. The meeting edges of the unit 10 and the sheathing 41 are covered by a conventional molding strip 49.

The posts 4 intermediate the upper and lower units are covered by the one piece panel 12 which meets with the extensions 20 and 38 in what is known as a coach joint, the construction of which is clearly indicated in Fig. 4 wherein it can be seen that the ends of the panel 12 and the extensions 20 and 38 are bent over sharply at substantially right angles and forced into the posts 4 in abutting relation. In Fig. 4 the lower end of the panel 12 is indicated as flanged at 52 to lie adjacent an inwardly extending flange 54 formed on the upper edge of the extension 38. If desired, a small recess such as a saw cut or the like may be made in the post to facilitate the fixing of the abutting flanges 52 and 54 in the post 4. Extending from the gutter 18 to the molding 49, heretofore described, and covering the spaces 39 and 40 between adjacent sections 8 and 10 respectively, is a molding strip 56 for an obvious purpose.

The panel 12 is of the form shown in the drawings and comprises the front face 58 and the sides 60, the edges of which latter are inwardly flanged as at 62 and then outwardly flanged as at 64 to lie adjacent the lining sheets 37 and to which they are secured by suitable fastenings 66 extending therethrough and into the post 4 as clearly shown in Fig. 3.

It has been found desirable to reinforce the upper coach joint and to that end filler strips 68 are arranged across the juncture of the extensions 20 and the panel 12 as clearly shown in Fig. 1, the strips having a recess 70 therein into which the abutting flanges of the extension 20 and panel 12 extend whereby to support the filler strips in position.

What is claimed is:

1. In a motor vehicle, a belt rail, a side plate, posts between the belt rail and side plate, a window framing comprising upper and lower units secured to the side plate and belt rail respectively, and having end extensions lapping the side posts for a portion only of the width thereof, said units having their inner edges flanged to provide curved corner portions and attaching sections intermediate the corner portions, and panels secured to the side posts and extending between the extensions.

2. In a motor vehicle, a belt rail, a side plate and a plurality of posts between the belt rail and side plate defining window openings, framing for said window openings comprising unit sections secured to the side plate and belt rail respectively, each having a main portion and end extensions lapping the side posts with adjacent edges in spaced relation, an attaching flange formed at the end of each extension and engaged in the post, panels secured to the posts and extending between the upper and lower unit extensions, and a molding strip extending from the side plate to the belt rail and covering the spaces between adjacent units.

3. In a motor vehicle, a belt rail, a side plate, and spaced posts connecting said belt rail and side plate and providing window openings, and window framing for said openings comprising upper and lower series of units arranged side by side in spaced relation against the side plate and belt rail respectively, and each comprising a main body portion and end extensions lapping the posts, the inner edge of each unit being flanged from the end of one extension to the end of the opposite extension to provide curved corner portions and an attaching portion therebetween, panels covering the posts intermediate the ends of the extensions, the ends of said panels being in abutting relation to the ends of adjacent units and the ends of said panels and units being secured in said posts, and a molding strip extending from the side plate to the belt rail and covering the spaces between adjacent sections.

4. In a motor vehicle, a side plate, a belt rail, spaced posts connecting said side plate and belt rail and defining window openings, and a framing for said openings comprising series of spaced upper and lower units secured to the side plate and belt rail respectively and having end extensions lapping the posts, attaching flanges formed at the ends of the extensions and engaged in the posts, panels covering the posts intermediate the extensions of said units, said panels having a front face of greater width than the posts and having side portions terminating in attaching flanges secured to the posts, and molding strips secured to the side plate and the belt rail and covering the spaces between adjacent unit sections.

5. In a motor vehicle, a belt rail, a side plate, spaced posts defining a plurality of window openings, and a roof sheet, means for framing said window openings comprising upper and lower series of units each comprising a main portion of a length to extend between and partially horizontally overlap spaced posts, said main portion having end extensions extending along and partially horizontally lapping spaced posts and gained thereinto at their ends, said upper units underlapping the roof sheet, and panels arranged between the ends of upper and lower unit end extensions.

6. In a motor vehicle, a belt rail, a side plate, and spaced posts defining a plurality of window openings, means for framing the window openings comprising a spaced pair of units for each window opening, each unit comprising a main portion and end extensions overlapping the posts, post panels between the end extensions, and moldings extending from the upper to the lower units along the posts and covering the spaces between adjacent main portions.

7. In a motor vehicle, a belt rail, a side plate, and spaced posts defining a plurality of window openings, means for framing the window openings comprising a spaced pair of units for each window opening, each unit comprising a main portion and end extensions overlapping the posts, post panels between the end extensions each thereof of a width corresponding to the combined width of the end extensions of adjacent units, and moldings extending from the upper to the lower units along the posts and covering the spaces between adjacent main portions.

8. In a motor vehicle, a belt rail, a side plate, and spaced posts defining a plurality of window openings, means for framing said openings comprising a spaced pair of units for each opening, each unit comprising a main portion and end extensions overlapping the posts, post panels between the end extensions and each thereof of a width corresponding to the combined width of the end extensions of adjacent units and each having side flanges secured to the sides of said posts, and moldings extending from the upper to the lower units and covering the spaces between adjacent units.

9. In a motor vehicle, a side plate, a belt rail, and spaced posts connecting the side plate and belt rail to define a window opening, framing for said opening comprising upper and lower sheet metal units having end extensions lapping the posts, panels secured to the posts and having inturned end flanges, the ends of said end extensions being inwardly flanged and arranged in abutting relation to the inturned flanges of the panels and said abutting flanges being gained into said posts, said units and panels having side flanges arranged in said window opening the ends of which are inturned in abutting relation, and reinforcing elements adjacent the posts and into which the abutting inturned ends are gained.

10. In a motor vehicle, a belt rail, a side plate, posts between said belt rail and side plate to define window openings, and means for framing said openings comprising an upper and lower unit for each of said window openings, each unit extending between spaced posts and partially overlapping the latter, a panel secured to each post and flanged around the sides thereof and extending between the ends of the upper and lower units, and reinforcing elements arranged adjacent the posts and across the junction of the panels and upper units.

11. In a motor vehicle, a belt rail, a side plate, posts between said belt rail and side plate to define window openings, and means for framing said openings comprising an upper and lower unit for each of said window openings, each unit extending between spaced posts and partially overlapping the latter, a panel secured to each post and flanged around the sides thereof and extending between the ends of the upper and lower units, and reinforcing elements arranged adjacent the posts and across the junction of the panels and upper units and into which the upper ends of the panels and the lower ends of the extensions are gained.

In witness whereof I have hereunto set my hand. ARTHUR G. HAWKES.